United States Patent [19]

Larson

[11] 4,217,789

[45] Aug. 19, 1980

[54] HYDRAULIC DRIVE MEANS AND CONTROLS THEREFOR

[75] Inventor: Walter F. Larson, Plainview, Tex.

[73] Assignee: Terrain King Corporation, Seguin, Tex.

[21] Appl. No.: 886,785

[22] Filed: Mar. 15, 1978

Related U.S. Application Data

[63] Continuation of Ser. No. 796,395, May 12, 1977, abandoned, which is a continuation of Ser. No. 651,926, Jan. 23, 1976, abandoned.

[51] Int. Cl.² .................................................. G05G 11/00
[52] U.S. Cl. ........................................... 74/470; 74/482
[58] Field of Search ................. 74/470, 479, 480, 481, 74/482

[56] References Cited

U.S. PATENT DOCUMENTS

| 2,821,091 | 1/1958 | Benner | 74/482 |
| 3,002,397 | 10/1961 | Du Shane et al. | 74/482 |
| 3,040,596 | 6/1962 | Du Shane et al. | 74/482 |
| 3,525,266 | 8/1970 | Brooks et al. | 74/481 |
| 3,535,951 | 10/1970 | Larson et al. | 74/482 |
| 3,868,003 | 2/1975 | Smith | 74/481 |
| 3,898,891 | 8/1975 | Colloton | 74/481 |
| 4,020,713 | 5/1977 | Cantley et al. | 74/480 B |

Primary Examiner—Lawrence J. Staab
Attorney, Agent, or Firm—Cox & Smith Incorporated

[57] ABSTRACT

A wheeled frame which is hydraulically powered and which will operate in either forward or reverse direction, with an over-ride control means to enable the wheeled frame to be driven in either direction, stopped and restarted in the same direction at the same speed by manipulation of the variable control means to vary the hydraulically powered fluid motor means to drive the wheeled frame from zero to maximum speed with the controls in one position and from zero to maximum speed with the controls in another position.

3 Claims, 7 Drawing Figures

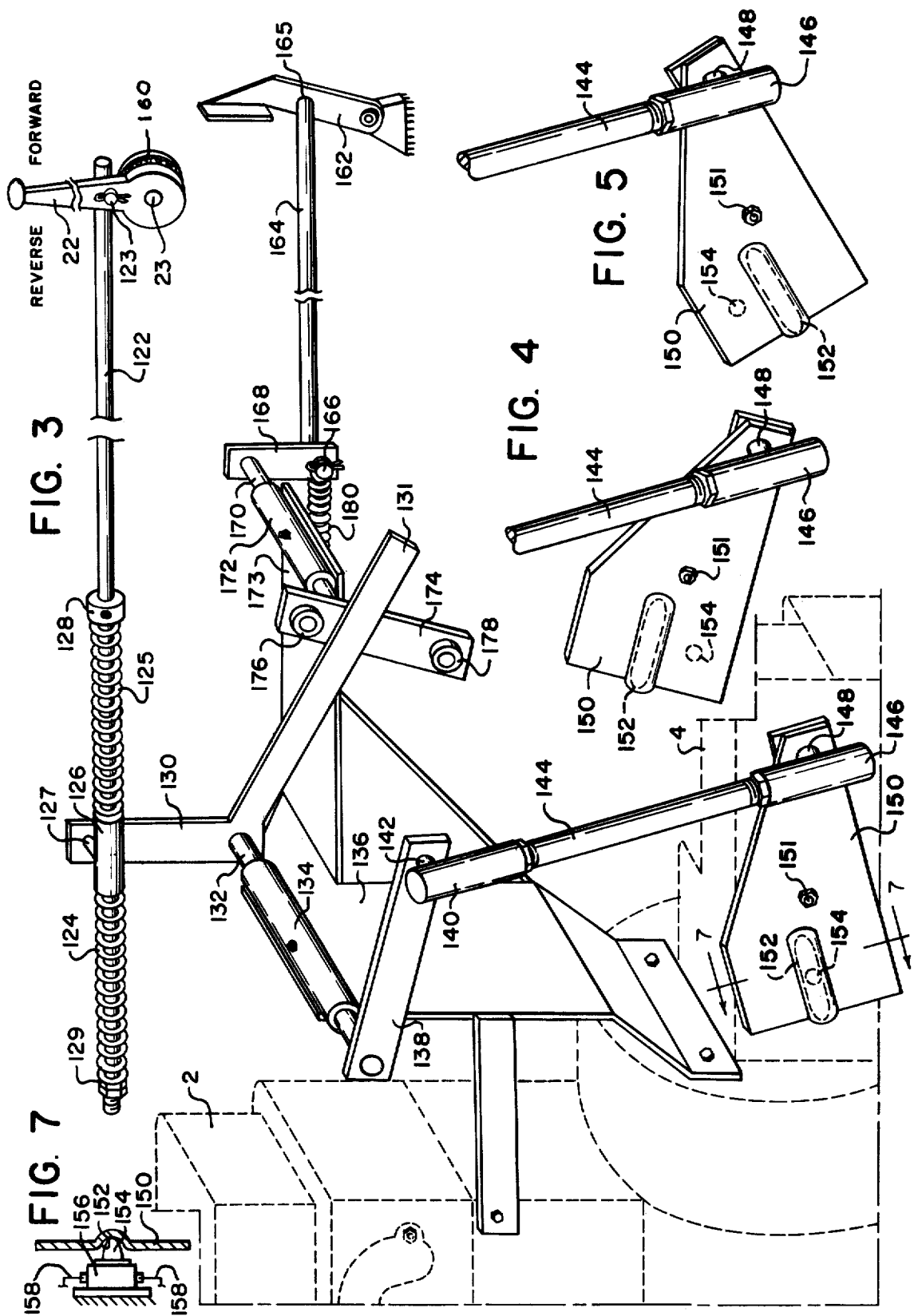

4,217,789

HYDRAULIC DRIVE MEANS AND CONTROLS THEREFOR

This application is a continuation application of application Ser. No. 796,395, filed May 12, 1977, now abandoned, for HYDRAULICALLY DRIVEN ROAD SWEEPER, which application Ser. No. 796,395 is a continuation of application Ser. No. 651,926, filed Jan. 23, 1976, now abandoned, for HYDRAULICALLY DRIVEN ROAD SWEEPER.

SUMMARY OF THE INVENTION

The present wheeled frame is driven over the terrain by hydraulic motor means, which gives smooth, dependable power without gears and chains, and is controlled in both forward and reverse, or in static condition by a control lever which control lever moves a swash plate in a variable displacement pump to give the desired speed in the desired direction, or the wheeled frame may be stopped and started again at the same speed in the same direction by manipulation of the controls therefor.

An object of the invention is to provide a forward and reverse drive for the hydraulically powered wheeled frame, with a forward and reverse control lever to enable the wheeled frame to be set at a given speed, either forward or reverse, with a safety over ride clutch pedal interconnected with a variable pressure, swash plate type pump so the clutch pedal may be used to shift the swash plate within the pump which will generate from zero to maximum displacement into either of the conduits leading therefrom to a motor to enable the hydraulic motor to remain non-rotatable or to be rotated from zero to maximum speed in either direction, and when the clutch pedal is released, the lever and cam linkage will permit the swash plate to return to its original position and the wheeled frame driven by the motor wll return to the original speed in the same direction.

DESCRIPTION OF THE DRAWINGS

With these objects in mind and others which will become manifest as the description proceeds, reference is had to the accompanying drawings in which:

FIG. 3 is an enlarged perspective view of a linkage and safety switch actuator plate, which plate may be set in a neutral position or moved to a forward or a reverse position by a hand control lever, which hand lever is frictionally held in any set position, with a pedal to serve as a clutch actuator to engage or to disengage the hydraulic swash plate of the pump drive, with cam action leverage to permit the return of the controls to the same position as before disengagement and to operate a neutral safety switch, and showing the neutral safety switch in contact position when the lever is in neutral position;

FIG. 4 is a fragmentary side elevational view of the plate which operates the neutral safety switch by cam action, showing the switch plunger in a depressed condition when the hand control lever is in forward position, and with the pedal in engaged position.

FIG. 5 is a view similar to FIG. 4 but in a reversing position, with the safety switch being shown in dotted outline;

FiG. 7 is a sectional view taken on the line 7—7 of FIG. 3, looking in the direction indicated by the arrows.

DETAILED DESCRIPTION OF THE INVENTION

Figure 1:
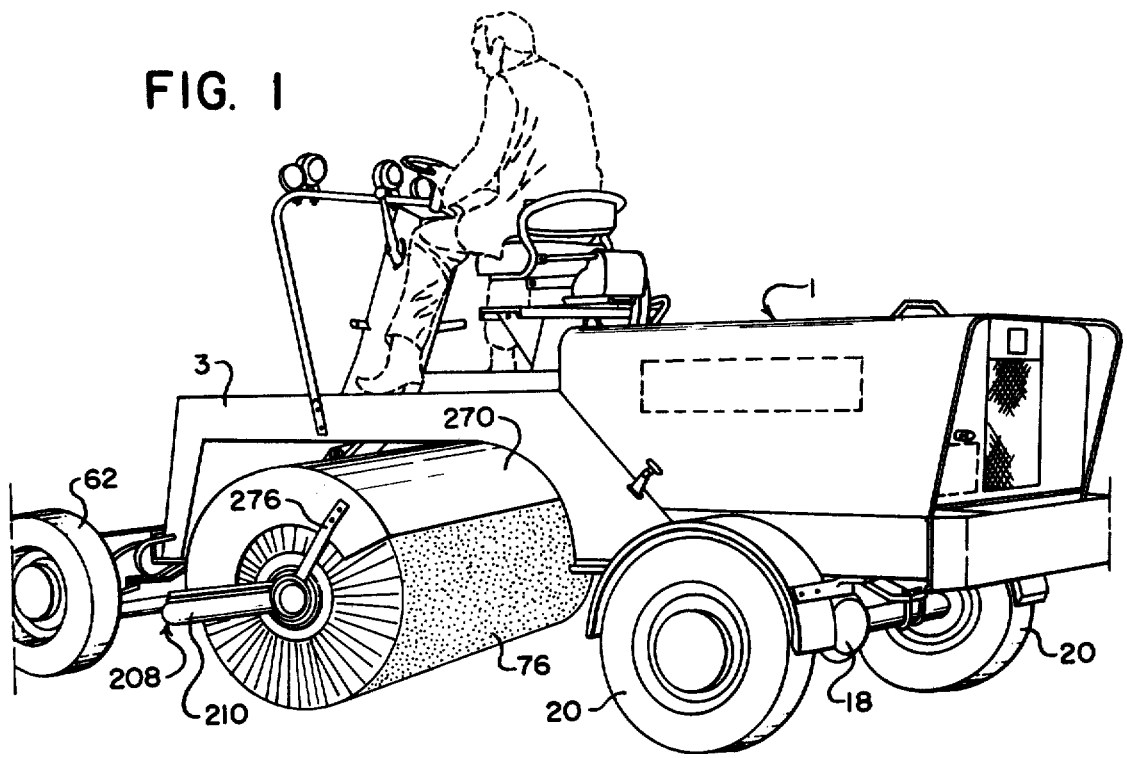
FIG. 1 is a perspective view of the hydraulically driven wheeled frame, with portions broken away.

With more detailed reference to the drawing, in which like reference characters designate like parts in the several views thereof, the numeral 1 designates generally a wheeled frame 3 on which a prime mover means is mounted, which prime mover means is designated generally by the numeral 2, which prime mover means may be an internal combustion engine. The prime mover means 2 drives a variable displacement pump means 4 and a high pressure displacement pump means 28.

The variable displacement pump means 4 withdraws hydraulic fluid from reservoir 6 through conduit 8, when the pump means 4 is rotated by prime mover means 2. The variable displacement pump means 4 directs hydraulic fluid outward through conduit into hydraulic motor means 14 which rotates drive shaft 16 in one direction, when the variable displacement pump controls are in one position the hydraulic fluid is directed into the motor 14 through conduit 10 and returned from the motor 14 through conduit 12 to the pump 4, which will rotate gears in the differential 18 to drive wheels 20 of the wheeled frame 1 in one direction, and when the swash plate within the variable displacement pump 4 is moved into another position by lever 22, FIG. 3. The reverse circulation of hydraulic fluid from the variable displacement pump 4 through conduit 12 to motor 14 and back through conduit 10 to the variable displacement pump 4 rotates the drive shaft 16 in the opposite direction to drive through gearing and differential 18 to rotate wheels 20 in the opposite direction.

A lever and pedal arrangement to operate the linkages and lever as shown in FIG. 3 constitutes a control for the variable displacement hydraulic pump 4, so when the lever 22 is moved in a forward direction, as indicated by the arrow, about pivot pin 23, a linkage rod 122, which rod is pivoted to lever 22 by pivot pin 123, is moved longitudinally to compress spring 125 which is positioned between pivoted sleeve 126 mounted on pivot pin 127 which is mounted on the bell crank lever 130 and a set collar 128, which set collar is adjustably secured to rod or linkage 122. A portion of bell crank lever 130 extends downward and is fixedly secured to axial shaft 132 which is mounted in a sleeve bearing 134 on bracket 136. The shaft 132 has an outstanding lever 138 fixedly secured thereto, which lever 138 extends outwardly and has a jointed connection, such as a ball joint 140 pivotally connected to lever 138 by pivot member 142. The ball joint 140 connects to linkage or rod 144 with a pivotal connection, such as a ball joint 146, which ball joint 146 is connected by a pivot member 148 to an arcuately movable plate 150, so upon movement of the lever 22 forwardly, as indicated by the arrows in FIG. 3, the plate 150 will be shifted from the position as shown in FIG. 3 to that shown in FIG. 4. In so doing, the plate 150, which has a groove 152 therein to receive a preferably round nose switch plunger 154 therein when in the position shown in FIG. 3, will be in neutral position. The plunger 154 engages within the groove 152 in plate 150 to close an electrical circuit 158.

When the plunger 154, as shown in FIGS. 3 and 7, is in this position, the circuit 158 is closed, which enables the prime mover 2 to be started to drive the variable displacement pump 4, which serves as a clutch and transmission to power the wheeled frame 1. However, with the lever 22 in neutral position, the swash plate within the variable displacement pump 4 will be held in such position that with the prime mover rotating, no fluid will be pumped.

A friction plate arrangement 160 frictionally holds the lever 22 in the position to which it is moved in either direction any graduated amount, however the movable foot pedal 162 is pivotally connected at 165 to one end of longitudinally movable rod 164, with the other end of the rod 164 being pivotally connected at 166 to a lever 168, to which lever a shaft 170 is fixedly secured. The shaft 170 is journaled in a sleeve bearing 172 mounted on a support bracket 173. The brackets 173 and 136 are connected to a suitable mounting, such as the prime mover 2. The shaft 170 has a cam action lever 174 fixedly secured to the opposite end thereof, with spaced apart rollers extending outwardly, one on each side of lever portion 131 of bell crank lever 130, which rollers are indicated at 176 and 178 when the clutch pedal 162 is depressed, the outstanding portion 131 of bell crank lever 130 is moved until the upstanding portion of the bell crank lever 130 occupies the position as shown in FIG. 3, which will move the swash plate within the variable displacement pump 4 to zero position so no fluid will be pumped. Therefore, the wheeled frame 1 will not be moved in either direction, yet the prime mover 2 will continue to rotate the swash plate within the variable displacement pump 4 without pumping fluid in either direction.

When it is desired to start the wheeled frame moving again, the pedal 162 is released and a tension spring 180 will return the pedal 162 into engaged position which moves lever 168, shaft 170 and cam action lever 174 so one of the rollers 176 or 178 will engage outwardly extending portion 131 of bell crank lever 130. This movement will allow the compression spring 124 to act against sleeve 126 to move the upwardly extending portion of bell crank lever 130 into the same position it occupied before the pedal 162 was depressed, which moves neutral safety switch switch 150 to rotate shaft 151 to move the swash plate into the same position it occupied before the clutch pedal was depressed, therefore the wheeled frame will move over the terrain in the same direction and at the same speed as before the pedal was depressed, in the present instance it would be in a forward direction. Therefore, when the wheeled frame resumes movement, it will be in the same direction and at the same speed.

The movement of the wheeled frame 1 may be reversed by moving the lever 22 rearwardly to compress spring 125 which will cause movement of pivoted bell crank lever 130, shaft 132 and lever 138 in the same manner as set out above for the forward movement, however, this rearward movement of lever 22 will move plate 150 into the position as shown in FIG. 5 and also will cause the shaft 151 to rotate to move the swash plate in the variable displacement pump 4, which will enable the wheeled frame to be moved rearwardly. To stop the wheeled frame the pedal 162 is depressed, which will cause cam roller 176 to engage outwardly extending portion 131 of bell crank lever 130 which will move the swash plate of the variable displacement pump 4 without changing the setting of lever 22, as the swash plate is connected with plate 150 by a bolt connection 151, which moves the swash plate into zero position when the pedal 162 is depressed.

Upon release of the pedal 162, the rod or linkage 164 is moved by tension spring 180 to move lever 168 and shaft 170 to permit the spring 125 to move the upstanding portion of bell crank lever 130 rearwardly until the portion 131 of the bell crank lever 130 engages cam roller 176. This movement will permit the plate 150 to move into the position shown in FIG. 5, to enable the swash plate within variable displacement pump 4 to be moved, by bolt 151 which is attached to the controls thereof, to the same position as the swash plate occupied before the clutch pedal was released, which will enable the sweeper to be moved rearwardly in accordance with the setting of lever 22, which lever is held against movement, except manually, by friction disc 160. The springs 124 and 125 may be adjusted longitudinally on rod or linkage 122 by set collar 128 and nuts 129, so as to properly adjust the neutral position of the upstanding portion of bell crank lever 130 with respect to the swash plate control plate 150, the adjustment of the set collar 128 and the nuts 129 also adjusts the springs so that the cam rollers 176 and 178 on cam lever 174 will engage the outstanding lever portion 131 to move the lever portion 131 into proper relation with respect to cam rollers 176 and 178.

Figure 2:
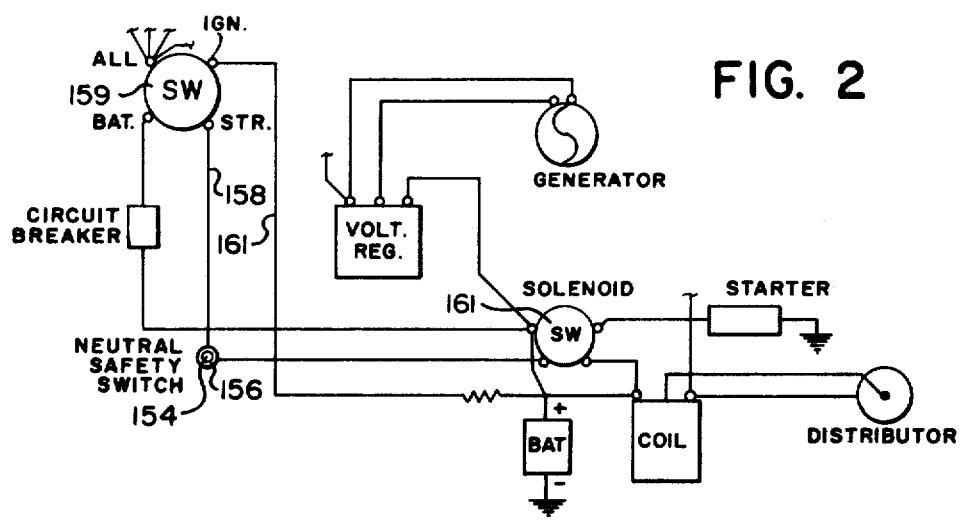
FIG. 2 is a diagrammatic view of the electrical system.
Figure 6:
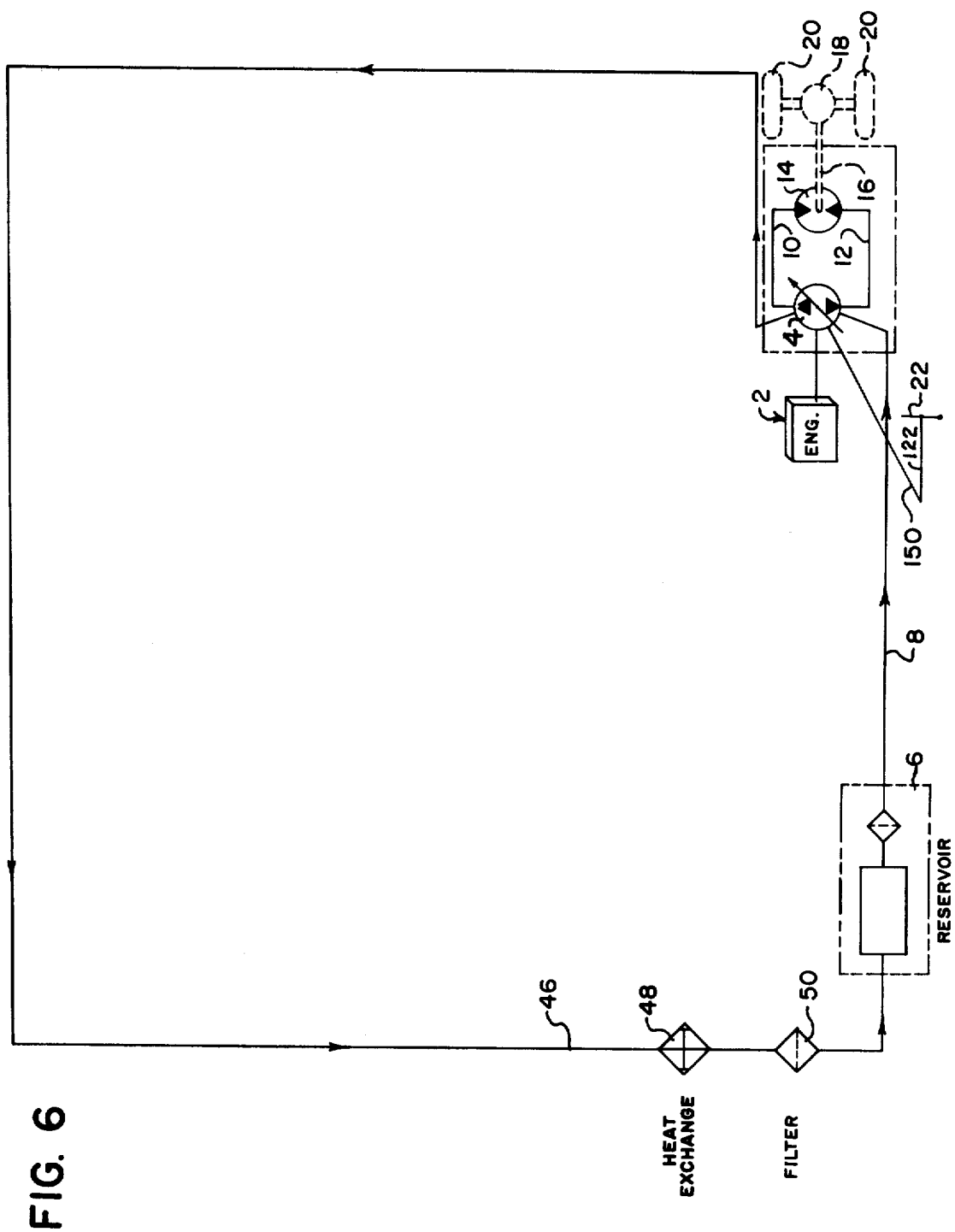
FIG. 6 is a diagrammatic view of the hydraulic system, showing the prime mover for operating the hydraulic system, which prime mover may be an internal combustion engine.

An electrical circuit is shown in FIG. 2, only the portions thereof being shown which are necessary for the operation of the prime mover and the safety switch 156, which safety switch 156 is in an electrical circuit with key starter switch 159. The safety switch is also in an electrical circuit with solenoid starter switch 161 to prevent the wheeled frame being started unless the swash plate within the variable displacement pump 4 is in zero pumping position.

The present wheeled frame 3 is shown to be that of a road or street sweeper 1, on which prime mover means, such as an internal combustion engine is mounted, which gives a representative use of a wheeled frame. The sweeper has drive wheels 20 and steerable wheels, 62, as is well known in the art of wheeled frames. The sweeper is shown to have a horizontal broom support member, designated generally at 208, which broom support member has an arm 210 to support the rotating broom 76, as is well known in the art of street and road sweepers. A dust guard shield 272 is shown as surrounding the upper portion of the rotatable broom 76. This merely shows one embodiment of the hydraulic drive means and the controls therefor, as the system is adaptable for any road or field vehicle, and the use thereof is not limited to sweepers.

What is claimed is:

1. An apparatus for controlling the rotated position of a control shaft, which apparatus comprises;
   a bell crank having first and second lever portions,
   first means rotatably mounting said bell crank,
   second means connecting said bell crank to said control shaft in a manner such that said control shaft will be rotated to a neutral position when said bell crank is swung to a predetermined position,
   a first lever for moving said bell crank from said predetermined position to a second position, third means rotatably mounting said first lever in a manner such that a predetermined force is required to rotate said first lever, a fourth means yieldably connecting one of said bell crank portions to said first lever in a manner such that said fourth means may yield and said bell crank may be rotated, when a force less than said predetermined force required to rotate said first lever, is applied to said bell crank, fifth means connected to the other of said bell crank lever portions for applying only said lesser force to said bell crank, whereby said bell crank may be returned from said second position without moving said first lever, by overcoming only said lesser force, whereby said first lever will remain in its predetermined position, said first and second means comprising a sleeve, sixth means mounting said sleeve in a first position, a shaft rotatably mounted in said sleeve, said shaft being connected to said bell crank for rotation thereby, a second lever affixed to said shaft for rotation thereby, a plate affixed to said control shaft for imparting rotation thereto, and a link connecting said plate to said second lever for arcuately moving said plate to rotate said control shaft when said bell crank is rotating.

2. An apparatus as stated in claim 1 wherein said fifth means comprises:

a pivot pin;

a foot pedal rotatably mounted on said pivot pin;

a rod connected to said foot pedal for reciprocation thereby;

a sleeve affixed to said apparatus;

a shaft rotatably mounted in said sleeve;

a second lever connecting said shaft to said rod in a manner such that said shaft will be rotated by reciprocation of said rod;

a cam action lever affixed to said shaft for rotation thereby; and a pair of rollers mounted on said cam action lever in spaced-apart relation, the other of said bell crank lever portions being positioned between said rollers for engagement thereby when said foot pedal is moved to rotate said shaft, whereby said bell crank may be swung to its predetermined position.

3. Apparatus for controlling the rotated position of a control shaft, comprising:

a first pivot pin affixed to said apparatus;

a first lever rotatably mounted on said first pivot pin;

a friction plate mounted on said first pivot pin in engagement with said first lever for resisting the rotation thereof with a predetermined force;

a first rod connected to said first lever for reciprocation thereby;

a first sleeve slidably receiving said first rod;

a first spring mounted on said first rod on one side of said first sleeve for moving said first sleeve in one direction when said first spring is compressed by swinging said first lever in a first direction, said first spring exerting less force on said first sleeve than the predetermined force exerted by said friction plate;

a second spring mounted on said first rod on the other side of said first sleeve for moving said first sleeve in a second direction opposite to said one direction for said sleeve when said second spring is compressed by swinging said first lever in a second direction opposite to said one direction for said first lever, said second spring exerting less force on said first sleeve than the predetermined force exerted by said friction plate;

a bell crank having first and second lever portions, said first sleeve being affixed to one of said lever portions;

a second sleeve affixed to said apparatus;

a first shaft rotatably mounted in said second sleeve, one end of said first shaft being affixed to said bell crank for rotation thereby;

a second lever affixed to the other end of said first shaft for rotation thereby;

a plate affixed to said control shaft for imparting rotation thereto;

a link connecting said plate to said second lever for arcuately moving said plate to rotate said control shaft from a neutral position in which said first and second springs are unloaded to a predetermined position in which one of said first and second springs is loaded when said first lever is rotated to a predetermined position from a neutral position;

a second pivot pin affixed to said apparatus;

a foot pedal rotatably mounted on said second pivot pin;

a second rod connected to said foot pedal for reciprocation thereby;

a third sleeve affixed to said apparatus;

a second shaft rotatably mounted in said third sleeve;

a third lever connecting one end of said second shaft to said second rod in a manner such that said second shaft will be rotated by reciprocation of said second rod;

a cam action lever affixed to the other end of said second shaft for rotation thereby; and a pair of rollers mounted on said cam action lever in spaced-apart relation, the other of said bell crank lever portions being positioned between said rollers for engagement thereby when said foot pedal is moved to rotate said second shaft, whereby said bell crank will be swung to a predetermined position such that said control shaft will be returned to said neutral position by unloading said one of said first and second springs without moving said first lever from its predetermined position.

* * * * *